Sept. 8, 1959 B. L. HAVENS 2,903,579

PULSE DELAY APPARATUS

Original Filed Sept. 3, 1948 3 Sheets-Sheet 1

Sept. 8, 1959 B. L. HAVENS 2,903,579

PULSE DELAY APPARATUS

Original Filed Sept. 3, 1948 3 Sheets-Sheet 3

United States Patent Office 2,903,579
Patented Sept. 8, 1959

2,903,579

PULSE DELAY APPARATUS

Byron L. Havens, Closter, N.J., assignor to International Business Machines Corporation, New York, N.Y., a corporation of New York Continuation of application Serial No. 262,732, December 21, 1951, which is a division of application Serial No. 47,626, September 3, 1948, now Patent No. 2,672,283, dated March 16, 1954. This application June 27, 1955, Serial No. 518,322

18 Claims. (Cl. 250—27)

This application is a continuation of application Serial No. 262,732 filed December 21, 1951, now abandoned, which is a division of application Serial No. 47,626 filed September 3, 1948, now Patent 2,672,283 issued March 16, 1954. The specification of Patent 2,672,283 is hereby incorporated by reference herein. The present invention relates to electric voltage pulse delay apparatus and more particularly to apparatus of this class which is of particular utility in electrically operated digital computing machines.

An object is to provide a new and simplified pulse inverting circuit.

A further object is to provide a novel synchronous delay circuit for voltage impulses.

Another object of my invention is to provide a novel electronic commutator.

In carrying out the invention in one preferred form thereof, there is provided a pulse delay apparatus including a series network having three rectifier elements connected between a first source of potential and a source of potential normally positive with respect to the first source of potential, the rectifier elements having maximum current conductivity in the direction toward the positive potential source. A source of input pulses is capacitively coupled to the junction of a first pair of the rectifier elements and the output is taken from the junction of a second pair of the rectifier elements.

Other objects and advantages of the invention are apparent from the following description and the accompanying drawings which disclose a preferred embodiment of the invention.

The utility of the present invention in digital computing apparatus is very adequately illustrated in the multiplying device which is disclosed in the above mentioned parent application which is now Patent 2,672,283. The present invention is disclosed but not claimed in that patent. The circuit of Figure 1 of the present application is shown for instance in Figure 2*f* of the patent.

The present invention is particularly useful in a time coded digital computing machine in which a particular period of time is assigned to each digital position in the binary number to be represented. The time base necessary in setting up the code is established by a starting impulse from a synchronizer which is repeated at periodic intervals. The time immediately following a starting impulse includes a plurality of time periods of equal length, each time period corresponding to a digital position in the binary number. The first time period following a starting impulse corresponds to the first digital position from the right end of the binary number; the second time period corresponds to the second digital position from the right end of the number; and so on through all of the time periods. If a voltage impulse occurs in any time period it represents a binary 1 at the corresponding digital position in the binary number. A binary 0 at any digital position is represented by the absence of a voltage impulse in the corresponding time period.

In the particular device illustrated in Patent 2,672,283 time periods of one microsecond each are employed and the device is designed to handle a product having a maximum of sixteen binary digits. Consequently, to obtain the maximum speed of operation, the starting impulse is repeated once every sixteen microseconds. The apparatus of the present may be advantageously employed for the purpose of establishing the item coded nature of the digital input information by supplying one or more spaced pulses at different locations which, through appropriate coincidence circuits, serve to cause information previously stored at those locations to be supplied to a multiplier or adder in the form of time coded serial pulses.

Figure 1:
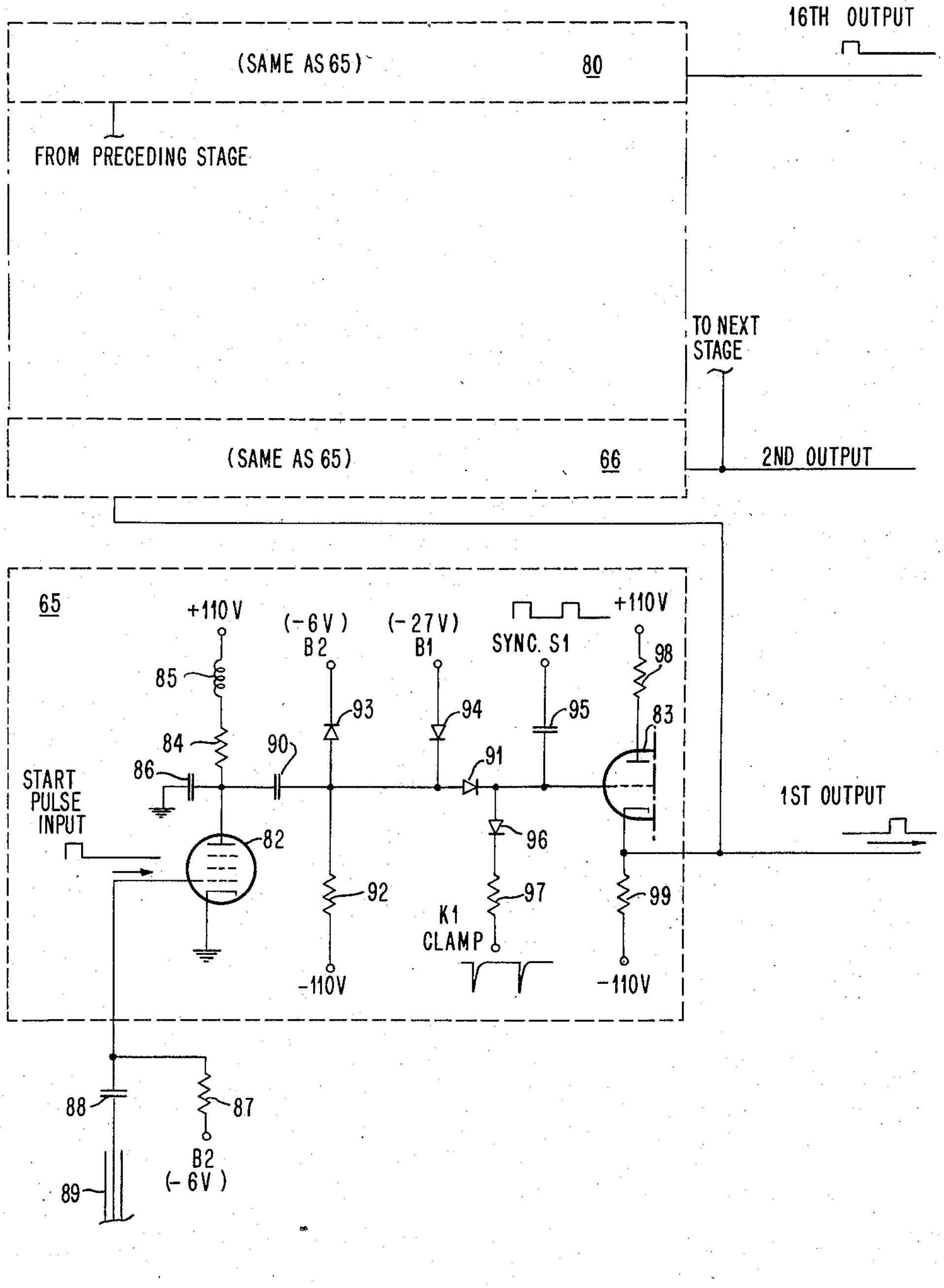
Fig. 1 is a schematic circuit diagram of a preferred embodiment of the basic apparatus of the present invention.

Referring more particularly to Fig. 1 there is shown an electronic commutator 65–80. The commutator has sixteen stages which are assigned the respective numbers 65 through 80. Each of the stages is a pulse delay circuit which is substantially identical to each of the other stages. Accordingly, for purposes of simplicity and clarity in the drawing, only the first stage 65 is shown in detail, the second stage 66 and the last stage 80 are simply indicated as boxes; and the others, which are connected between 66 and 80, are not shown.

In operation, a starting impulse is received from a synchronizer at the first stage 65 of the commutator in the lower left-hand corner of Fig. 1 and that impulse is passed along from stage to stage at a rate of one time period, that is, one microsecond, per stage.

Each commutator stage comprises a pentode 82, such as a Western Electric 6AK5 tube and a triode 83, preferably half of a twin triode such as a Western Electric 2C51 tube, and their associated circuits. The anode of the pentode 82 is connected to the +110 volts supply through a resistor 84 and an inductor 85. A condenser 86 is connected from the anode of the pentode 82 to the ground. The cathode of the pentode 82 is connected to the ground; the suppressor grid is connected to the cathode; and the screen grid is connected to the +110 volts supply line. The control grid of the pentode 82 of the first stage 65 of the commutator is connected through a resistor 87 to the biasing voltage line B2 (−6 v.) and also through a coupling condenser 88 to a coaxial line 89 through which the starting impulse is delivered. The control grid of each of the pentodes 82 of the other stages is connected to the cathode of the triode 83 of the next lower stage arranged in a cathode follower circuit.

The various D.C. voltages required for the circuit may be obtained from conventional sources which are not shown. In addition to the plus 110 volt and minus 110 volt supplies, biasing voltages B1 and B2 are provided which preferably have values respectively of minus 27 volts and minus 6 volts.

The output of each pentode 82 of the commutator 65—80 is delivered to the corresponding triode 83 by a coupling from the anode of the pentode 82 to the control grid of the triode 83 through a coupling condenser 90 and a first diode 91, preferably a germanium crystal diode, such as a Sylvania 1N34 crystal, which offers its lower impedance to current flow toward the grid. The junction point between the coupling condenser 90 and the first diode 91 is connected through a resistor 92 to the —110 volts supply line. This same junction point is also connected through a second diode 93, also preferably a germanium crystal diode, to the biasing supply line B2 with the diode 93 offering its lower impedance to current flow toward the biasing line B2. The same junction point is further connected through a third diode 94, also preferably a germanium crystal diode, to the biasing voltage line B1, with the third diode 94 offering its higher impedance to current flow toward the biasing line B1. The control grid of each triode 83 is also coupled by a condenser 95 to a synchronous impulse supply line S1 which is connected to the synchronizer to be later described. The triode control grid is also connected through a fourth diode 96, also preferably a germanium crystal diode, and a resistor 97 in series therewith, to a clamp impulse supply line K1, which is connected to the synchronizer, with the fourth diode 96 offering its lower impedance to current flow toward the clamp supply line K1. The anode of each triode 83 is connected through a resistor 98 to the +110 volts supply line while the cathode is connected to the —110 volts supply line through a load resistor 99 in a cathode follower circuit which differs somewhat from the conventional cathode follower in that the cathode is tied to a point substantially negative with respect to the grid return circuits. This permits impulses to be transmitted more readily by the cathode follower.

Figure 3:
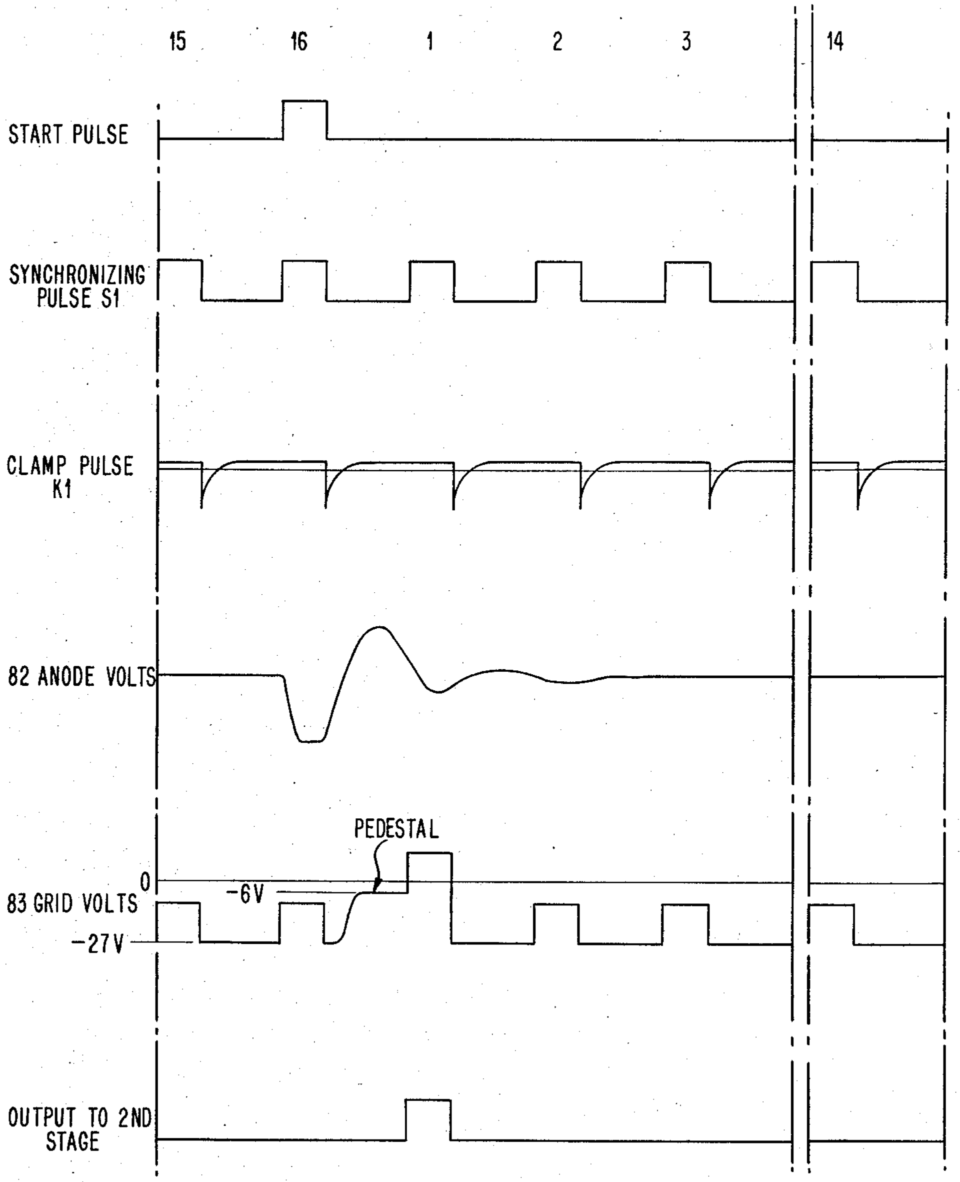
Figure 3 is an idealized graphical representation of the voltage conditions in various portions of the circuit of Figure 1.

As illustrated in the second curve in Fig. 3, a positive rectangular, low impedance, synchronous voltage impulse is supplied through the synchronous impulse line S1 from the synchronizer once each time period; that is, once each microsecond. This synchronous impulse is arranged to be approximately one-third of a microsecond in duration and as shown in the first curve in Fig. 3, a starting impulse is arranged to occur simultaneously with every sixteenth synchronous impulse. Coincident with the termination of each synchronous impulse, a negative voltage impulse having a steep wave front is supplied through the clamp line K1 from the synchronizer. The clamp impulse wave is shown in the third curve of Fig. 3. The function and relative magnitudes of the synchronous and clamp impulses are described hereinafter in the discussion of the operation of the commutator.

In Fig. 3, for purposes of simplicity and clarity, the voltage curves are shown only for pulse periods 1, 2, 3, 14, 15, and 16, omitting pulse periods 4 through 13, since those voltage pulses would be substantially identical to the pulses in period 3 (as viewed at stage 65).

The circuit arrangement, including the pentode 82, triode 83 and diodes 91, 93, 94 and 96, in each commutator stage, as just described, constitutes a synchronous pulse delay circuit. Considering, for example, any given one of commutator stages 65–80 let it be assumed that the grid of triode 83 is originally at the potential (—27 v.) of bias supply line B1 and condenser 95 is charged to the difference between the voltage of line B1 and the voltage of line S1. Now, because of the connection of the —110 volts line through resistor 92 to the junction between the condenser 90 and the first diode 91, that junction tends to be highly negative. However, the connection of the third diode 94 prevents the junction from being more negative than biasing line B1 which in this particular arrangement may be about —27 volts. The diodes 91 and 94 together also prevent the grid of the triode 83 from becoming more negative than biasing line B1. It is then evident that while the pentode 82 is non-conductive, the condenser 90, coupling the anode of the pentode 82 to the control grid of the triode 83, is charged to the voltage difference between the +110 volts supply line and the biasing line B1 (—27 v.). When a positive impulse is impressed on the control grid of the pentode 82, it becomes conductive and the voltage at its anode drops. The coupling condenser 90 then discharges but its terminal remote from the pentode 82 necessarily remains at the voltage level of the biasing line B1. At the termination of the positive impulse at the grid, the pentode 82 again becomes non-conductive and the voltage of its anode rises. As a result, a positive voltage impulse is passed through the coupling condenser 90 and the first diode 91 to the grid of the triode 83 and also to the condenser 95. This voltage behavior of the anode of pentode 82 is illustrated in the fourth curve of Figure 3. However, through the action of the second diode 93, the maximum voltage of the positive impulse thus delivered to the grid of the triode 83 is limited to the voltage level of the biasing line B2 (—6 v.), which level is more positive than that of biasing line B1.

Although the duration of the positive impulse passed through the coupling condenser 90 is relatively short, it changes the charge on the condenser 95 coupling the grid of the triode 83 to the synchronous impulse line S1 to establish the grid at the level of line B2. The purpose of the first diode 91 is to permit the voltage of the terminal of the coupling condenser 90 which is remote from the pentode 82 to return to the level of biasing line B1 without removing such charge from the condenser 95 and altering the voltage of the grid of the triode 83. The tendency of the remote terminal of the coupling condenser 90 to return to the level of line B1 is the result of the combination of two effects, one being the second overshoot of the anode pulse of the pentode 82 and the other being the action of the resistor 92 connecting that terminal to the —110 volts supply line. If this remote terminal has not completely returned to the level of line B1 by the time the next clamp impulse occurs, the return is completed by that clamp impulse. It is desirable that the remote terminal of the condenser 90 be substantially returned to the level of line B1 before the next clamp impulse occurs, for if the return is accomplished primarily by the clamp impulse, a spurious negative impulse is generated in the anode circuit of pentode 82, which is obviously undesirable.

From the foregoing, it is evident that if the pentode 82 of the given stage remains non-conductive, the grid of the triode 83 is at the voltage level of biasing line B1. However, when the pentode 82 becomes conductive as the result of a positive impulse on its grid, a voltage pedestal is established on the grid of the triode 83 of the same stage at the level of biasing line B2. The constants of the load circuit of the pentode 82 are chosen to give the optimum wave shape for establishing the pedestal. It is to be noted that the voltage pedestal is established as a result of the pentode 82 becoming non-conductive rather than as a result of the pentode becoming conductive upon application of the positive impulse on its grid.

The magnitude of a synchronous impulse on line S1 is such that if the grid of the triode 83 in the given commutator stage is at the voltage level of biasing line B1, prior to the synchronous impulse, the output impulse produced at the cathode of triode 83 will be negligible and insufficient to raise the voltage of the control grid of the pentode 82 of the next stage above cutoff. But if the grid of the triode 83 is at the level of biasing line B2 prior to the synchronous impulse, (i.e., a voltage pedestal is present), the impulse produced at the cathode of triode 83 is appreciable and thus causes the pentode 82 in the succeeding stage to become conductive. The above described voltage behavior of the control grid of triode 83 is plotted in an idealized form in the fifth curve of Figure 3. The output impulse from the triode 83 is shown in the 6th and last curve of Figure 3.

As a synchronous impulse terminates, a clamp impulse is delivered on line K1. This highly negative clamp impulse acts through the fourth diode 96 and resistor 97 to change the charge on the condenser 95 to return the grid of the triode 83 to the voltage level of the biasing line B1, thus terminating the voltage pedestal. The fourth diode 96 isolates the clamp supply line K1 from the rest of the grid circuit of the triode 83 except during the clamp impulse. This isolation is effective because the clamp supply line K1 is normally slightly positive when no clamp impulse is being received. The resistor 97 in series with the fourth diode 96 serves as a decoupling resistor to improve the isolation of the clamp circuit.

It has thus been shown that a properly timed positive impulse on the grid of the pentode 82 in any given stage causes a voltage pedestal to be established on the grid of the triode 83 of the same stage. As previously pointed out, this pedestal is not established until after the termination of the positive grid impulse which initiated it. This pedestal permits the succeeding synchronous impulse to be effectively transmitted through the triode 83 to provide the positive grid impulse for the pentode 82 of the succeeding stage. This positive grid impulse on the pentode of the succeeding stage is, in turn, effective in the manner just described to cause that succeeding stage to provide a positive grid impulse on the pentode of the second succeeding stage at the time of the second succeeding synchronous impulse. It can be seen that these commutating circuits comprise a chain of delay stages, whose delay is determined by the repetition rate of the synchronous impulses. The repetition rate of the synchronous impulses in this particular device is one million impulses per second affording a delay of one microsecond per stage. If a positive grid impulse is provided for the first stage coincident with every sixteenth synchronous impulse, it is evident that this impulse will become a commutating impulse which will be passed along from stage to stage at a rate of one stage per microsecond. Under these conditions, with sixteen stages as shown, a commutating impulse is always present in one of the stages, a new commutating impulse being introduced to the first stage as the preceding commutating impulse leaves the last stage. To introduce this new commutating impulse, a starting impulse is provided through coaxial line 89 coincident with every sixteenth microsecond.

It will be evident that for other applications these circuits may be used as a chain of delay stages for storage and transmission of timed impulses and that as many impulses may be transmitted and stored simultaneously as there are stages. It is also possible for delay applications to eliminate the cathode follower circuit incorporating triode 83 in each stage and connect the junction between condenser 95 and diodes 91 and 96 directly to the grid of the pentode 82 of the following stage.

The resistors 98 in the anode circuits of the triodes 83 are provided to eliminate parasitic oscillations which might be produced when both sides of a twin triode tube are employed in cathode follower circuits as they are in this arrangement.

For purposes of convenience and clarity in the understanding of the present invention, in Figure 1, the various input pulse voltage wave shapes are indicated in the circuit of 65 at the various input points, and the output wave shape is indicated at the output of stage 65 and also at the output of stage 80. These wave shapes correspond to the portions of the related wave shapes shown in more detail in Fig. 3, from the beginning of the sixteenth pulse period to the end of the first pulse period. In addition to the start pulse, there is also shown the synchronous pulse S1 and the clamp pulse K1.

As explained more fully in the above mentioned Patent 2,672,283 the output pulses from the stages 65 through 80 can be connected through coincidence circuits to various information storage devices in order to provide a serial "read-out" of that information.

*Synchronizer and start pulse circuits*

Figure 2:
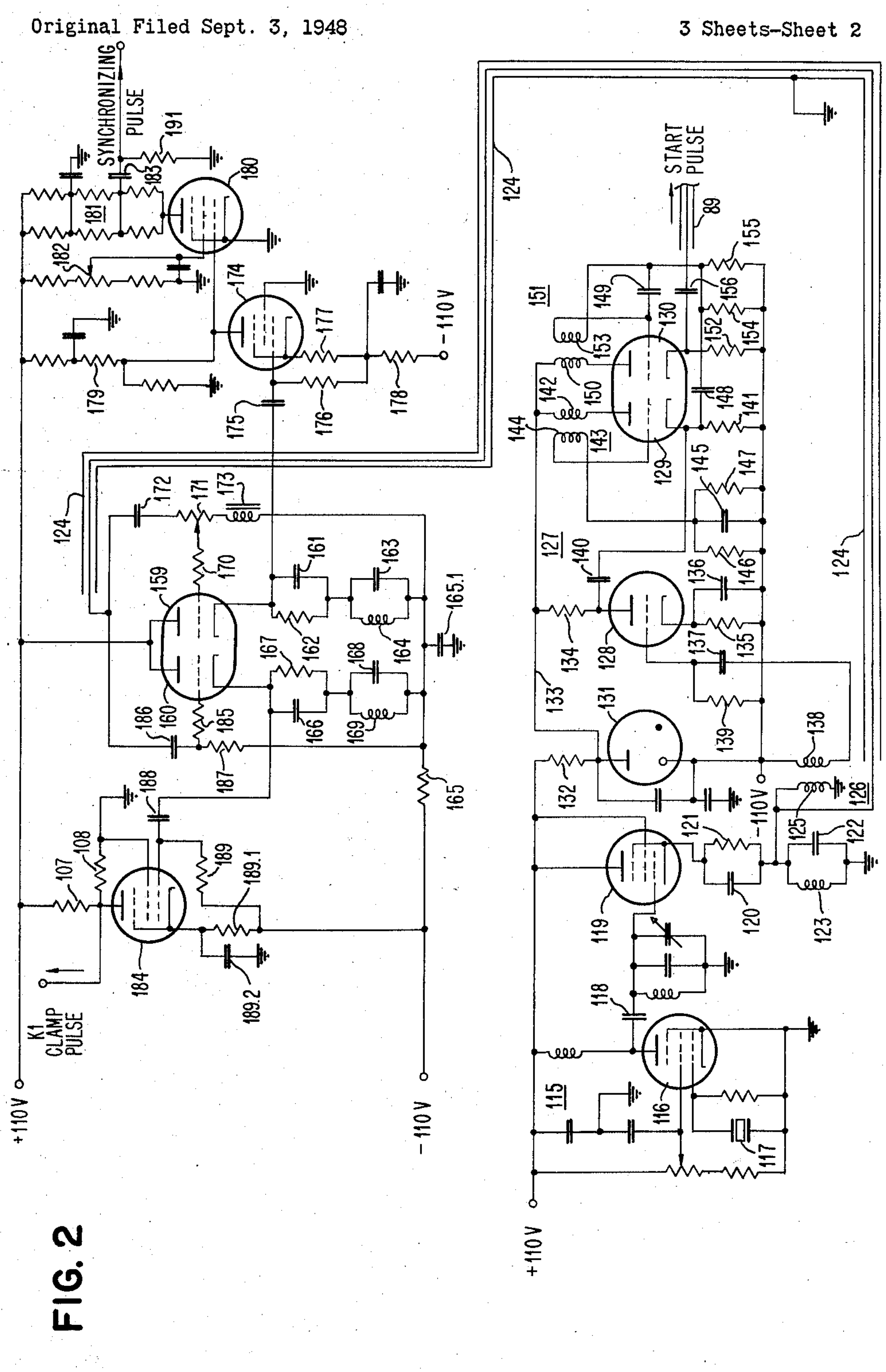
Fig. 2 is a schematic circuit diagram showing the sources of voltage pulses for the circuit of Fig. 1.

In Fig. 2 there are shown the circuit arrangements for supplying synchronizing pulses, clamping pulses, and starting pulses.

A crystal oscillator circuit 115 of a conventional design is provided which employs a pentode 116, such as an RCA 50B5 tube, and a crystal 117 arranged to control the frequency of the oscillator to provide a one megacycle per second frequency output. The output of the crystal oscillator is coupled by a condenser 118 to the grid of another pentode 119, such as an RCA 50B5 tube. The anode of the pentode 119 is connected to the +110 volts supply line, while the cathode is connected through a condenser 120 and resistor 121 in parallel therewith and thence through another condenser 122 and inductor 123 in parallel therewith to the ground. The parallel connected condenser 122 and inductor 123 are arranged as a resonant circuit having a resonant frequency of one megacycle per second. The one megacycle alternating voltage output taken from the junction point between the parallel connected condenser 120 and resistor 121 and the parallel connected condenser 122 and inductor 123 is fed into a coaxial line 124. The output is also fed to the primary winding 125 of a high frequency transformer 126.

The output of the transformer 126 is used to supply the one megacycle alternating voltage to a counting down circuit 127. The counting down circuit includes a first tube 128 arranged to translate the alternating voltage into a series of negative voltage impulses having a one megacycle frequency, a second tube 129 arranged in a blocking oscillator circuit responsive to these impulses and a third tube 130 arranged in a second blocking oscillator circuit responsive to the output of the first blocking oscillator circuit. The first tube 128 is preferably a triode, such as an RCA 6C4 tube, while the second and third tubes 129 and 130 are also triodes, preferably contained in a single envelope as in an RCA 12AU7 tube.

A voltage regulator tube 131, such as an RCA VR150 tube, is also provided having its anode connected through a resistor 132 to the +110 volts supply line while its cathode is connected to the −110 volts supply line. An auxiliary voltage supply line 133 is connected to the anode of the voltage regulator tube 131 so that a substantially constant voltage appears between the auxiliary supply line 133 and the −110 volts supply line.

The anode of the first tube 128 is connected through a resistor 134 to the auxiliary supply line 133 while its cathode is connected through a resistor 135 and a condenser 136 in parallel therewith, to the −110 volts supply line. The grid of the first tube 128 is connected through a condenser 137 to one terminal of a secondary winding 138 of the transformer 126, the other terminal of which is connected to the −110 volts supply line. The grid of the first tube 138 is also connected through a grid resistor 139 to the −110 volts supply line. With this arrangement, the first tube 128 is grid-leak biased normally below cutoff. However each positive peak of the alternating voltage supplied through transformer 126 causes the grid of the first tube 128 to become positive, thereby producing a negative voltage impulse at the anode of that tube. This negative impulse occurs at a frequency of one megacycle per second, or, in other words, a negative impulse is produced once each microsecond.

The negative impulse provided at the anode of the first tube 128 is fed through a coupling condenser 140 to the cathode of the second tube 129. The cathode of this second tube 129 is also connected through a resistor 141 to the −110 volts supply line while the anode is connected through a primary winding 142 of another transformer 143 to the supply line 133. The grid of the second tube 129 is connected through a secondary winding 144 of the transformer 143 and a timing condenser 145 to the −110 volts supply line. A pair of resistors 146 and 147 are connected in parallel with each other and with the timing condenser 145.

In considering the operation of the first blocking circuit employing tube 129, it is assumed that the timing condenser 145 is at first charged with a polarity causing the grid of tube 129 to be highly negative, thereby maintaining the tube 129 non-conductive. A negative impulse fed to the cathode of the tube 129 from the tube 128 is then insufficient to cause the tube 129 to become conductive. However, the timing condenser 145 gradually discharges through the resistors 146 and 147 at such a rate that by the time the fourth impulse is received from the tube 128, that is, at the end of four microseconds, the timing condenser 145 is sufficiently discharged that the fourth impulse causes the tube 129 to become conductive. When tube 129 becomes conductive, the transformer 143 produces a voltage causing the grid of tube 129 to become even more positive with respect to the cathode. As a result, a relatively large grid current flows causing the timing condenser 145 to be recharged with a polarity which makes the grid highly negative when the impulse supplied from the tube 128 has subsided. The tube 129 then becomes non-conductive and remains non-conductive until the fourth succeeding impulse from tube 128 is received. A positive voltage impulse is thus produced once each four microseconds across the cathode resistor 141 associated with the tube 129.

The voltage impulses produced across the resistor 141 are transferred through a second timing condenser 148 and another condenser 149 to the grid of the tube 130 in the second blocking oscillator circuit. The anode of tube 130 is connected through a primary winding 150 of another transformer 151 to the auxiliary supply line 133. The cathode of tube 130 is connected through a resistor 152 to the −110 volts supply line. The secondary winding 153 of the transformer 151 is connected in parallel with the condenser 149 between the grid of tube 130 and the second timing condenser 148, the condenser 149 forming a low impedance path for the impulse from resistor 141 as contrasted with the high impedance path through the secondary winding 153. A pair of resistors 154 and 155 are connected in parallel with each other from the junction point between the condensers 148 and 149 to the −110 volts supply line.

In considering the operation of the second blocking oscillator circuit including tube 130, it is assumed that the second timing condenser 148 is at first charged with a polarity causing the grid of tube 130 to be highly negative, thereby maintaining the tube 130 non-conductive. The grid is sufficiently negative that a positive voltage impulse provided across resistor 141 in the first blocking circuit is insufficient to cause the tube 130 to become conductive. However, the second timing condenser 148 begins to discharge at a predetermined rate through the resistors 141, 154 and 155. This rate is such that by the time the fourth voltage impulse appears at resistor 141, that is, sixteen microseconds later, the second timing condenser 148 is sufficiently discharged that the fourth voltage impulse at resistor 141 causes tube 130 to become conductive. When tube 130 becomes conductive, the transformer 151 produces a voltage causing the grid of tube 130 to become highly positive so that a relatively high grid current flows resulting in a recharging of the second timing condenser 148 with a polarity which causes the grid of tube 130 to become highly negative when the voltage impulse at resistor 141 has subsided. In this manner, a positive voltage impulse is produced across the cathode resistor 152 once for each sixteen microseconds.

The output impulses of the counting down circuit 127, which is, in effect, the output impulses of the second blocking oscillator, is coupled through a condenser 156 to the coaxial line 89. These output impulses, which are the starting impulses, are conducted by the coaxial line 89 to the grid of the first pentode 82 in the first stage 65 of the commutator in Fig. 1.

It is to be remembered that the one megacycle alternating voltage output of tube 119 is also fed into the coaxial line 124. From this coaxial line 124, the alternating voltage is supplied to the inputs of a pair of triodes 159 and 160. The triodes 159 and 160 are preferably contained in a single envelope such as in a Western Electric 2C51 tube. The anodes of tubes 159 and 160 are connected together to the +110 volts supply line while their cathodes are individually connected to the −110 volts supply line. The cathode of tube 159 is connected through a condenser 161 and a resistor 162 in parallel with each other, a condenser 163 and inductor 164 in parallel with each other, and a resistor 165 to the −110 volts supply line. The cathode of tube 160 is connected through a condenser 166 and a resistor 167 in parallel therewith, a condenser 168 and an inductor 169 in parallel with each other, and the resistor 165 to the −110 volts supply line. The inductor 164 and condenser 163 are arranged in a resonant circuit having a resonant frequency of one megacycle per second, as are the condenser 168 and inductor 169.

The grid of tube 159 is connected through a resistor 170 to an intermediate tap on a resistor 171 which in turn is connected in series with a condenser 172 and an inductor 173 between the terminal of the coaxial line 158 and the end of resistor 165 which is remote from the −110 volts supply line. Thus, the alternating voltage supplied through the coaxial line 158 is applied to the grid of tube 159. The arrangement of the resistor 171, condenser 172 and inductor 173 permits an adjustment of the phase of the alternating voltage applied to the grid of tube 159 for a purpose to be described hereinafter.

The alternating voltage output appearing at the cathode of tube 159 is fed through an A.C. coupling to another tube 174, which is preferably a Western Electric 6AK5 tube. The A.C. coupling is furnished by a condenser 175 connected between the cathode of tube 159 and the control grid of tube 174, and a resistor 176 connected from the control grid of tube 174 to a point intermediate a pair of resistors 177 and 178 which are in series between the cathode of tube 174 and the −110 volts supply line. The anode of tube 174 is connected to an intermediate point on a voltage divider 179 which is connected between the +110 volts supply line and the ground. Thus, a negative voltage impulse appears at the anode of tube 174 once each cycle of the alternating voltage which is once each microsecond.

The anode of tube 174 is also connected to the control grid of another tube 180, which is preferably a pentode such as an RCA 50B5 tube. The cathode and suppressor grid of tube 180 are connected together to the ground while the anode is connected through a resistor network 181 to the +110 volts supply line. The screen grid of tube 180 is connected to an intermediate point on another voltage divider 182 which, in turn, is connected between the +110 volts supply line and the ground.

Inasmuch as the anode of tube 174 is connected both to the control grid of tube 180 and to an intermediate point on the divider 179, tube 180 is normally conductive with the control grid somewhat positive. When tube 174 becomes conductive, the resulting negative voltage impulse at its anode is impressed on the control grid of tube 180 to drive that grid below cutoff resulting in a positive voltage impulse at the anode of tube 180. The constants of the circuits are arranged so that the positive impulse at the anode of tube 180 lasts for approximately one-third of a microsecond with approximately two-thirds of a microsecond between successive impulses. Because the control grid of tube 180 is driven between cutoff and grid conduction, the output voltage appearing at the anode of tube 180 is a substantially rectangular wave.

It is to be noted that the resistor 177 in the cathode circuit of tube 174 is of such value that a sufficient self-biasing action is provided thereby to protect tube 174 as well as tube 180 from damage in the event of accidental failure of excitation from tube 159.

The output of tube 180 is taken from an intermediate point on the resistor network 181 and applied through a coupling condenser 183 and resistor 191 to the synchronous impulse supply line S1 for the commutator shown in Fig. 1. This synchronous impulse occurs once each microsecond beginning concurrently with the starting impulse. The anode circuit resistance for tube 180 is of a relatively low value to provide a low impedance output.

The tube 160 in Fig. 2 is also fed with an alternating voltage from the coaxial line 158 and is used in conjunction with another tube 184, such as an RCA 50B5, to develop the clamp impulse. The grid of tube 160 is connected through a resistor 185 to the junction point between a condenser 186 and a resistor 187 which are connected in series in the order named between the terminal of coaxial line 158 and the end of resistor 165 which is remote from the —110 volts supply line. A decoupling condenser 165.1 is connected from this remote end of resistor 165 to ground. The cathode of tube 160 is connected through a condenser 188 to the control grid of the tube 184 which grid is also connected through a resistor 189 to the —110 volts line. The anode of tube 184 is connected to the point intermediate resistors 107 and 108 in series from the +110 volts supply line to the ground. The cathode of tube 184 is connected through a resistor 189.1 to the —110 volts line and through a condenser 189.2 to ground.

Tube 184 is grid-leak biased and the time constants involved in the condenser 188 and the resistor 189 are such that only the peak of the alternating voltage sine wave causes tube 184 to become conductive. Therefore, a narrow negative voltage impulse appears at the anode of tube 184 at a time corresponding to the positive peak of the one megacycle alternating voltage from tube 160. The phase adjustment provided for the synchronous impulse by the circuit comprising resistor 171, condenser 172 and inductor 173, is so arranged that the narrow negative clamp impulse of relatively high amplitude occurs at the end of each synchronous impulse. This clamp impulse is taken from the anode of tube 184 and is applied to the clamp supply line K1 for the commutator in Fig. 1. Since the clamp line K1 is connected to a point between resistors 107 and 108, which is slightly above ground, the rest potential of the clamp line is sufficiently positive to avoid clipping the synchronous impulses on the grids of triodes 83.

As explained in more detail an the above mentioned Patent 2,672,283, and with particular reference to Fig. 2*h* of that patent and column 21 of the specification of that patent; it is possible to usefully employ the pulse delay circuit of the present invention (first stage 65 of Figure 1) for the purpose of receiving and reshaping a time coded series of pulses which may occur at a radio frequency such as 1 megacycle, and it is possible for this pulse delay circuit to receive and transmit two successive pulses in the time coded pulse train which begin only one microsecond apart so that the first pulse is being transmitted while the next pulse is being received.

While in the description of the fundamental novel features of the invention as applied to a preferred embodiment and as illustrated in the drawings, reference has been made to tubes of specific types, it will be understood that other tubes of suitable characteristics may be employed instead. It will also be understood that various other omissions, substitutions and changes in the form and details of the device illustrated and in its operation may be made by those skilled in the art without departing from the spirit of the invention. It is the intention, therefore, to be limited only as indicated by the scope of the following claims.

What is claimed is:

1. An impulse time delay apparatus for receiving an input voltage impulse comprising; an output circuit; an electronic tube connected in said output circuit and having a control electrode for controlling current flow therethrough in accordance with the control electrode voltage; means connected to said control electrode to supply a synchronous voltage impulse thereto periodically, including means permitting said control electrode to produce an effective current impulse in the output circuit in response to a synchronous impulse only when the control electrode is above a first voltage level at the time of that synchronous impulse; means responsive to an input impulse to place said control electrode above said first level; and means connected to said control electrode to place it at a second voltage level below said first level after each synchronous impulse.

2. An impulse time delay circuit comprising; an electronic tube, a load circuit including an impedance load in series with the tube and means establishing a voltage across said load and tube with the load end remote from said tube being more positive; control means for the tube adapted to receive a positive input voltage impulse permitting a current impulse through the tube and producing a negative voltage impulse at a point on the load circuit intermediate said more positive load end and the tube; an output circuit arrangement having first and second base voltage levels, the first level being more positive than the second; means connected to said output arrangement to supply a synchronous voltage impulse thereto periodically, said output arrangement including means providing an effective output impulse in response to a synchronous impulse only when it is at the first base level at the time of that synchronous impulse; means responsive to the termination of a negative impulse at said point to place said output arrangement at said first base level; and means connected to said output circuit arrangement to place it at said second base level immediately after each synchronous impulse.

3. An impulse time delay circuit comprising a pair of electronic tubes; a load circuit for the first of said tubes including an impedance load in series with the first tube and means establishing a voltage across said load and first tube with the load end remote from said tube being more positive; control means for the first tube adapted to receive a positive input voltage impulse permitting a current impulse through the first tube and producing a negative voltage impulse at a point on the load circuit intermediate said more positive load end and the tube; an output circuit, said second tube being interposed in said output circuit and having a control electrode for controlling current flow therethrough in accordance with the control electrode voltage; means connected to said control electrode to supply a synchronous voltage impulse thereto periodically, said control electrode permitting an effective current impulse in the output circuit in response to a synchronous impulse only when the control electrode is at least as positive as a first voltage level at the time of that synchronous impulse; means connected to said control electrode to place it at a second voltage level more negative than said first level after each synchronous impulse; and coupling means connecting said load point to said control electrode and responsive to the termination of a negative impulse at said point to place said control electrode at the first level.

4. An impulse time delay circuit comprising a first line normally maintained at a first voltage and adapted to have a negative voltage impulse appear thereon; an output line; a coupling condenser and a rectifier connected in series in the order named from the first line to the output line, said rectifier offering its lower impedance to current flow toward the output line; means connected to the junction between said coupling condenser and rectifier tending to maintain said junction at a second voltage more negative than said first voltage; means connected to said junction to limit the voltage thereof to a value no more negative than a third level intermediate said first and second voltages and no more positive than a fourth level intermediate said first voltage and said third level, whereby said junction is normally maintained at said third level but upon the decay of a negative voltage impulse on said first line a positive impulse attaining the fourth level appears at said junction; an auxiliary condenser coupling the output line to a synchronizing impulse source causing a positive voltage impulse to be superimposed periodically on the voltage level of said output line; and means for momentarily changing the voltage on said output line to said third level following each synchronizing impulse; whereby said auxiliary condenser is charged to maintain said output line normally at said third level but the charge is changed to raise said output line to said fourth level by one of said positive impulses at said junction.

5. An impulse time delay circuit comprising a first line normally maintained at a predetermined voltage and adapted to have a negative voltage impulse appear thereon; an output line; a coupling condenser and a first rectifier connected in series in the order named from the first line to the output line, said first rectifier offering its lower impedance to current flow toward the output line; means connecting the junction between said coupling condenser and first rectifier to a first source of voltage more negative than said predetermined voltage; a second rectifier connected to conduct current to said junction from a second source of voltage of a value intermediate said predetermined and said first source voltages, whereby said junction is normally maintained at the level of said second source voltage; a third rectifier connected to conduct current from said junction to a third source of voltage of a value intermediate said predetermined and said second source voltages; an auxiliary condenser coupling the output line to a synchronizing impulse source causing a positive voltage impulse to be periodically superimposed on the voltage level of said output line; a fourth rectifier connected to conduct current from said output line to another impulse source providing another impulse more negative than said second source voltage on said output line following said synchronizing impulse, whereby said output line is normally at the level of said second source voltage and has a voltage pedestal of the level of the third source voltage established thereon by a positive impulse passed thereto from said first line upon the decay of a negative impulse on the latter so that the voltage level of the output line during a synchronous impulse is greater if an impulse has appeared on the first line simultaneously with or subsequent to the preceding synchronous impulse.

6. An impulse time delay device comprising a pair of electronic tubes; a load circuit including an impedance load in series with the first of said tubes and means establishing a voltage across said load and first tube with the end of the load remote from the tube being more positive; control means for the first tube normally maintaining it non-conductive but adapted to receive an input impulse permitting a current impulse through the tube, whereby a point on said load circuit between said load and tube is normally at a first voltage level but has a negative voltage impulse thereon when an input impulse is received; an output circuit for the second tube including means establishing a voltage thereacross, said second tube having an electrode controlling current flow therethrough in accordance with the electrode voltage level; a coupling condenser and a first rectifier connected in series in the order named from said point to said electrode with the rectifier offering its lower impedance to current flow toward said electrode; resistive means connecting the junction between the coupling condenser and first rectifier to a first source of voltage more negative than said first level, a second rectifier connected to conduct current to said junction from a second source of voltage of a value intermediate said first level and said first source voltage; a third rectifier connected to conduct current from said junction to a third source of voltage of a value intemediate said first level and the second source voltage, whereby said junction is normally maintained at said first source voltage but upon the decay of a negative impulse at said point a positive voltage impulse attaining the level of the second source voltage appears at said junction; an auxiliary condenser connecting said electrode to a synchronizing impulse source causing a positive impulse to be superimposed periodically on the voltage level of said electrode; a fourth rectifier connected to conduct current from said electrode to another impulse source providing an impulse on said electrode at the end of each synchronizing impulse which is at least as negative as said first source voltage, whereby said auxiliary condenser is charged to maintain said electrode normally at the level of said first source voltage but the charge is changed to raise said electrode to the level of said second source voltage by one of said positive impulses at said junction.

7. A commutator comprising a plurality of stages connected in a series chain, each stage including an input terminal and an output circuit arrangement; means connected to the output arrangements of all of the stages to supply a synchronous voltage impulse thereto periodically and simultaneously; the output circuit arrangement of each stage having an effective and an ineffective voltage condition and providing an effective output impulse in response to a synchronous impulse only when it is in said effective voltage condition at the time of that synchronous impulse; the output circuit arrangement of each stage except the last being connected to feed each effective output impulse thereof as an input impulse to the input terminal of the next succeeding stage; means connected to the input terminal of the first stage to supply an input impulse thereto; each stage also including means responsive to the termination of an input impulse to place the output circuit arrangement in its effective voltage condition; and means connected to the output circuit arrangements of all of the stages to place them in their ineffective voltage condition immediately after each synchronous impulse.

8. A commutator comprising a plurality of stages connected in a series chain; each stage comprising a pair of electronic tubes, a load circuit for the first of said tubes including an impedance load in series therewith and means establishing a voltage across said load and first tube with the load end remote from said tube being more positive, and control means for the first tube adapted to receive a positive input voltage impulse permitting a current impulse through the first tube to produce a negative voltage impulse at a point on the load circuit intermediate said more positive load end and the tube, an output circuit, said second tube being interposed in said output circuit and having a control electrode for controlling current flow therethrough in accordance with the control electrode voltage; means connected to the control electrodes of all of the stages to supply a synchronous voltage impulse thereto periodically and simultaneously; the control electrode in each stage permitting an effective output impulse in the output circuit in response to a synchronous impulse only when the control electrode is at least as positive as a first voltage level at the time of that synchronous impulse; said output circuit of each stage except the last being connected to feed an output impulse thereof to the control means of the next succeeding stage as an input impulse; means connected to the control means of the first stage to supply an input impulse thereto; each stage also including coupling means from said load point to said control electrode responsive to the termination of a negative impulse at said point to place said control electrode at the first level; and means connected to the control electrodes of all of the stages to place them at a second voltage level more negative than the first level immeditaely after each synchronous impulse.

9. A commutator comprising a plurality of stages connected in a series chain; each stage comprising an input circuit arrangement and an output circuit arrangement, said input circuit arrangement having a first point normally at a first voltage and being arranged to receive an input voltage impulse and in response thereto provide a negative voltage impulse at said first point, and a coupling condenser and a rectifier connected in series in the order named from said first point to a second point in the output circuit arrangement with the rectifier offering its lower impedance to current flow toward the second point; means connected to the junction between said condenser and rectifier in each of the stages tending to maintain said junction at a second voltage more negative than said first voltage; means connected to said junction in each stage to limit the voltage thereof to a value no more negative than a third level intermediate said first and second voltages and no more positive than a fourth level intermediate said first voltage and third level, whereby said junction is normally at said third level but upon decay of a negative impulse at said first point a positive impulse attaining the fourth level appears at said junction; an auxiliary condenser for each stage connecting the second point to a synchronizing impulse source causing a positive synchronous impulse to be applied thereto in all stages simultaneously and periodically; means connected to the second point in all of the stages to momentarily change the voltage at the second point to said third level immediately following each synchronizing impulse, whereby said auxiliary condenser in each stage is charged to maintain said second point normally at said third level but the charge is changed to raise the second point to said fourth level by a positive impulse at said junction; said output arrangement in each stage providing an effective output impulse in response to each synchronous impulse only when the second point is at the fourth level at the time of that synchronous impulse; means connecting the output arrangement of each stage except the last to the input arrangement of the next succeeding stage to supply each output impulse thereto as an input impulse; and means connected to the input arrangement of said first stage to supply an input impulse thereto.

10. Pulse delay apparatus comprising the combination of: an input terminal adapted to receive negative-going input pulses; a series network comprising a plurality of rectifier elements connected between a source of relatively low negative potential and a source of normally positive potential, said rectifier elements having maximum current conductivity in a direction toward said positive potential source; a series network comprising a plurality of impedance elements connected between said input terminal and a source of relatively high negative potential, the junction of a pair of said impedance elements being connected to the junction of a first pair of said rectifier elements; and output means connected to the junction of a second pair of said rectifier elements.

11. Pulse delay apparatus comprising the combination of: a series network comprising a plurality of rectifier elements connected between a source of negative potential and a source of normally positive potential, said rectifier elements having maximum current conductivity in a direction toward said positive potential source; a source of positive-going input pulses coupled to the junction of a first pair of said rectifier elements; an output terminal connected to the junction of a second pair of said rectifier elements; a source of positive-going synchronizing pulses coupled to said output terminal; and coincidence-detecting means associated with said output terminal.

12. Pulse delay apparatus comprising the combination of: a series network comprising a plurality of rectifier elements connected between a source of negative potential and a source of normally positive potential, a source of input pulses coupled to the junction of a first pair of said rectifier elements, an output terminal connected to the junction of a second pair of said rectifier elements, a source of synchronizing pulses coupled to said output terminal, and coincidence-detecting means associated with said output terminal.

13. Pulse delay apparatus capable of receiving an input pulse while delivering an output pulse resulting from a prior input pulse comprising the combination of: a series network comprising three rectifier elements connected between a first source of potential and a source of potential normally positive with respect to said first source of potential, said rectifier elements having maximum current conductivity in a direction toward said positive potential source; a source of input pulses and a source of restoring voltage connected together and capacitively coupled to the junction of a first pair of said rectifier elements; output means connected to the junction of a second pair of said rectifier elements; the polarities of said input pulses and said restoring voltage being related to the polarity connections of the center rectifier element to prevent transmission to said output means of a voltage signal immediately resulting from each input pulse, but to permit transmission of the voltage signal derived from the restoring voltage upon termination of each input pulse.

14. Pulse delay apparatus comprising the combination of: an electron discharge device having a control electrode, a cathode and an anode; means for applying positive-going input pulses to said control electrode; an inductively reactive load impedance connected between said anode and a first source of positive potential; a series network comprising a plurality of rectifier elements connected between a source of relatively low negative potential and a second source of normally positive potential, said rectifier elements having maximum conductivity in a direction toward said second positive potential source; a series network comprising first and second impedance elements connected between said anode and a source of relatively high negative potential, said first impedance element being capacitively reactive and the junction of said first and second impedance elements being connected to the junction of a first pair of said rectifier elements; and output means connected to the junction of a second pair of said rectifier elements.

15. Pulse delay apparatus comprising the combination of: an electron discharge device having a control electrode, a cathode and an anode; means for applying input pulses to said control electrode; a load impedance connected between said anode and a first source of positive potential; a series network comprising a plurality of rectifier elements connected between a first source of negative potential and a second source of normally positive potential; a series network comprising a plurality of impedance elements connected between said anode and a second source of negative potential, the junction of a pair of said impedance elements being connected to the junction of a first pair of said rectifier elements, a rectifier element connected between said connected junctions and a third source of negative potential, said second, first and third sources of negative potential having respectively decreasing potential values; and output means connected to the junction of a second pair of said plurality of rectifier elements.

16. Pulse delay apparatus comprising the combination of: an electron discharge device having a control electrode, a cathode and an anode; means for applying input pulses to said control electrode; a load impedance connected between said anode and a first source of positive potential; a series network comprising a plurality of rectifier elements connected between a first source of negative potential and a second source of normally positive potential; a series network comprising a plurality of impedance elements connected between said anode and a second source of negative potential, the junction of a pair of said impedance elements being connected to the junction of a first pair of said rectifier elements; and output means connected to the junction of a second pair of said rectifier elements.

17. A device for receiving an input and providing an output simultaneously, said device comprising in combination: input and output terminals; means for applying a series of input pulses occurring respectively within predetermined successive equal time intervals to said input terminal; and means between said input and output terminals for effectively delaying each said input pulse to produce an output pulse at said output terminal simultaneously with the application of the next succeeding one of said input pulses to said input terminal, said last-mentioned means comprising plural rectifier elements connected to form a plurality of junctures, capacitive means responsive to an input pulse to control the potential of a first juncture and to simultaneously store a representation thereof at a second juncture, and a source of synchronizing pulses having the same periodicity as said input pulses and coupled to one of said junctures to establish the period of said output pulse.

18. A device for receiving an input and providing an output simultaneously, comprising in combination: an output terminal; input means for receiving a series of input electrical manifestations occurring respectively within predetermined successive time intervals; and delay means joining said input means and said output terminal comprising cascaded rectifier elements connected to isolate said input and output terminals and capacitive means coupled to said rectifier elements for controlling the operation of said rectifier elements, thereby producing an effective delay of each said input electrical manifestation in its transit through said delay means, and pulse means coupled to one of said elements for determining the amount of delay of said delay means, whereby each delayed input manifestation appears as an electrical manifestation at said output terminal simultaneously with the application of the next succeeding one of said input electrical manifestations to said input means.

References Cited in the file of this patent

UNITED STATES PATENTS

| | | |
|---|---|---|
| 2,211,942 | White | Aug. 20, 1940 |
| 2,294,863 | Hadfield | Sept. 1, 1942 |
| 2,402,916 | Schroeder | June 25, 1946 |
| 2,415,855 | Skellett | Feb. 18, 1947 |
| 2,458,599 | Hussey | Jan. 11, 1949 |
| 2,542,152 | McConnell | Feb. 20, 1951 |
| 2,575,087 | Baker | Nov. 13, 1951 |
| 2,731,571 | Chance | Jan. 17, 1956 |

UNITED STATES PATENT OFFICE

CERTIFICATE OF CORRECTION

Patent No. 2,903,579 September 8, 1959

Byron L. Havens

It is hereby certified that error appears in the printed specification of the above numbered patent requiring correction and that the said Letters Patent should read as corrected below.

Column 2, line 17, after "present" insert -- invention --; line 18, for "item" read -- time --; column 9, line 41, for "detail an" insert -- detail in --.

Signed and sealed this 19th day of July 1960.

(SEAL)
Attest:

KARL H. AXLINE
Attesting Officer

ROBERT C. WATSON
Commissioner of Patents